A. SACHS
DEVICE FOR FORMING RECESSES AND ENLARGEMENTS ON SHOE INSOLES
Dec. 30, 1930. Re. 17,914
Original Filed Jan. 2, 1929
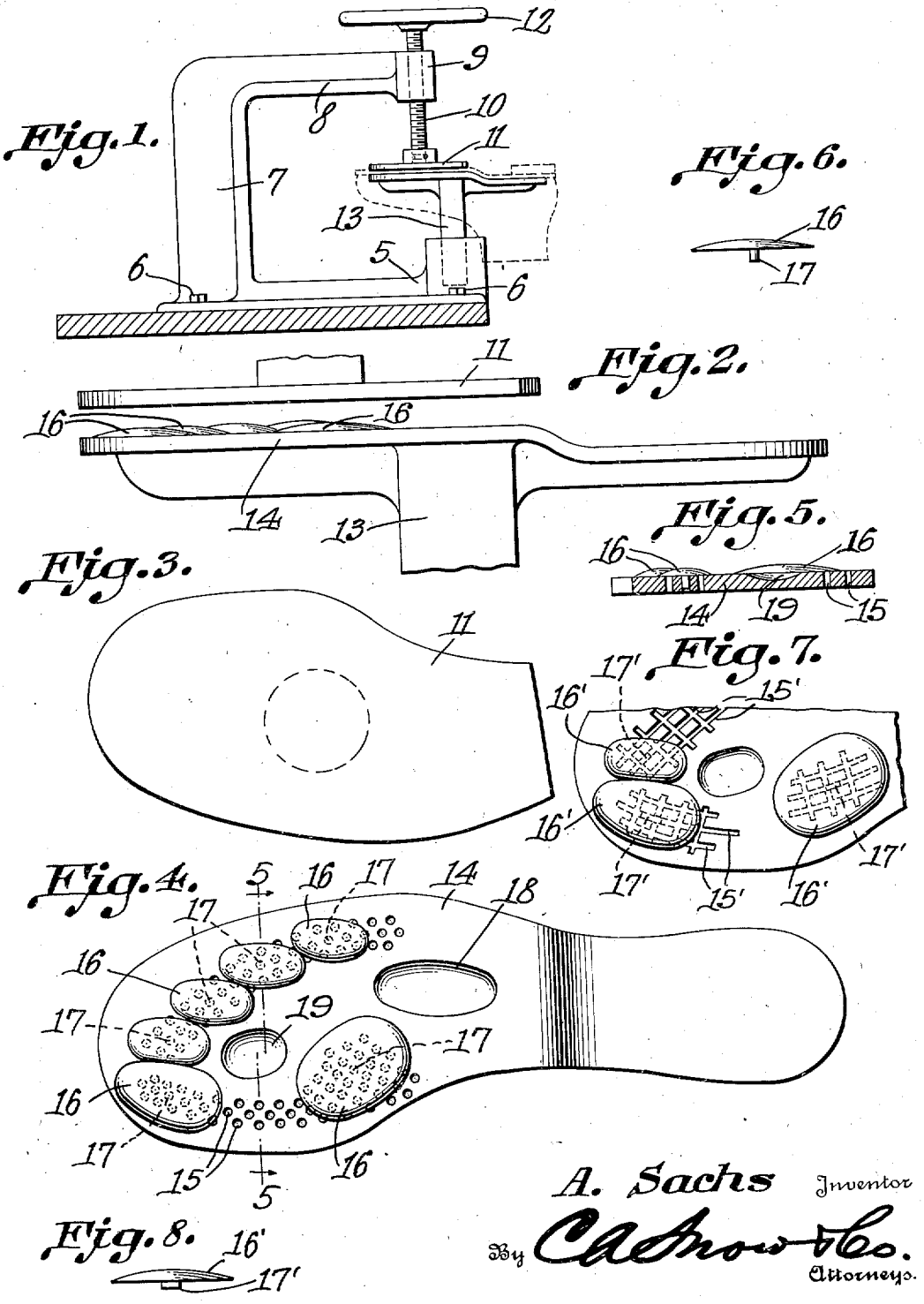
A. Sachs Inventor
By C. A. Snow & Co. Attorneys.

Reissued Dec. 30, 1930

Re. 17,914

UNITED STATES PATENT OFFICE

ABRAHAM SACHS OF SALISBURY, MARYLAND, ASSIGNOR TO SACHS SOLE SHAPING MACHINE COMPANY, INCORPORATED, A CORPORATION OF MARYLAND

DEVICE FOR FORMING RECESSES AND ENLARGEMENTS ON SHOE INSOLES

Original No. 1,747,029, dated February 11, 1930, Serial No. 329,733, filed January 2, 1929. Application for reissue filed August 15, 1930. Serial No. 475,608.

This invention relates to a device especially designed for treating insoles of shoes, the primary object of the invention being to form cavities and enlargements on the insole so that the upper surface of the insole will conform to the shape of the bottom of the foot of the wearer to render a new shoe comfortable for immediate wear. This object is achieved by applying pressure in a single direction substantially perpendicular or normal to the plane of the inner bottom of the shoe, so that in forming depressions therein, no substantial creeping of the insole nor damage to the fabric and leather of the shoe will take place. In this manner, densification is accomplished without destroying the shape, beauty or wearing qualities of the shoe.

An important object of the invention is to provide a device of this character embodying a support in the form of a last, adjustable members being positioned on the support which members will form the necessary cavities or recesses when pressure is directed to the shoe sole against the adjustable members.

Another object of the invention is to provide adjustable members of various sizes, so that cavities or recesses of various sizes may be formed in the surface of the insole.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a side elevational view of a device constructed in accordance with the invention.

Figure 2 is an enlarged view illustrating the supporting member and cooperating pressing member.

Figure 3 is a bottom view of the pressing member.

Figure 4 is a plan view of the supporting member showing recess forming members as adjustably supported thereon.

Figure 5 is a sectional view taken on line 5—5 of Fig. 4.

Figure 6 is a side elevational view of one of the recess forming members.

Figure 7 is a partial plan view of a modified form of supporting member and recess forming member.

Figure 8 is a side elevation view of a recess forming member.

Referring to the drawing in detail, the reference character 5 designates the base of the device which is bolted to a suitable supporting structure, by means of the bolts 6. Extending upwardly from the base is an arm 7 that has a forwardly extended integral arm 8 provided with a head 9 at its free end, which head is formed with a threaded bore to receive the threaded shank 10 to which the pressure plate 11 is connected.

A swivel connection is provided between the threaded shank 10 and pressure plate 11, so that the threaded shank 10 may rotate to move the pressure plate vertically, without rotating the pressure plate. A hand wheel 12 is secured to the upper end of the threaded shank 10 to rotate the threaded shank. The base 5 is provided with a socket to receive the shank 13 of the support 14 which is in the form of a shoe last.

Formed in the upper surface of the support 14, are rows of spaced openings 15 which are arranged adjacent to the edge of the support, as clearly shown by Figure 4 of the drawing. Removable members indicated at 16 are positioned on the support 14, it being understood that these members 16 are of various sizes and provided with curved outer surfaces so that the cavities or recesses formed thereby will be curved to conform to the shapes of the toes of the foot positioned in the shoe provided with an insole treated by a device of this character.

A pin indicated at 17 extends from the lower surface of each member 16, the pins of the members 16 being of sizes to fit within the openings 15 so that the members 16 will be detachably supported on the member 14, and may be adjusted to various positions so that impressions or cavities may be formed in an insole in certain locations to receive the enlargements of certain feet.

Recesses such as indicated at 18 and 19 respectively, are formed in the supporting member and provide clearances so that portions of the insole may move into these recesses when pressure is exerted on the enlargements in the formation of recesses in the insole with the result that when the insole has been treated by the device, cavities or recesses will be formed in the surface of the insole while enlargements will be formed adjacent to certain recesses to the end that the surface of the insole will conform to the shape of the bottom of the foot of the wearer.

In the form of the invention as shown by Figures 7 and 8, the supporting member is provided with grooves 15′ to receive the ribs 17′ formed on the cavity forming members 16′ so that the cavity forming members may be adjusted to various positions on the supporting member.

In the use of the device a pattern is first made of the sole of the foot of the person to wear the shoe, the pattern indicating the exact points where cavities should be formed in the insole for the reception of the toes or certain enlargements of the foot.

The cavity forming members 16 are now positioned on the supporting member 14 to conform with the indications presented by the pattern, whereupon the supporting device is positioned in the base and the shoe placed over the supporting member in a manner as shown by Figure 1. The hand wheel 12 is now rotated moving the pressure plate 11 into close engagement with the sole of the shoe, where it may be held under pressure. When the threaded shank 10 is moved upwardly releasing the pressure on the pressure plate 11 the shoe may be removed from the support 14, and it will be found upon inspection of the insole, that recesses and enlargements are formed therein.

What I claim, is:

1. A device of the class described, including a supporting member, said supporting member having a plurality of parallel and transverse communicating grooves, and members having ribs adjustably positioned in the grooves, said members being adapted to be forced into engagement with the insole of a shoe to form depressions in the insole.

2. An apparatus for breaking in shoes comprising in combination, a supporting member, an anvil having an area to support the fore part of a shoe, said anvil being mounted on the supporting member and having rows of openings in the working face about a portion of the margin thereof adapted to receive one or more enlargements to adjustably position the same, a complemental member cooperating with said anvil, and screw pressure means carried by the support and operable normal to the anvil to press the complemental member in contact with the sole and cause localized pressure over the elargements.

3. An aparatus for breaking in shoes comprising in combination, a supporting member, an anvil having an area to support the fore part of a shoe, said anvil being mounted on the supporting member and having a series of openings in the working face, said openings being arranged substantially about the outer half-sole margin of the anvil adapted to receive one or more enlargements to adjustably position the same, said enlargements conforming to and simulating toe and deformed foot shapes, a complemental member cooperating with said anvil, and screw pressure means carried by the support and operable normal to the anvil to press the complemental member in contact with the sole and cause localized pressure over the enlargements.

4. An apparatus for breaking in shoes comprising in combination, a supporting member, an anvil having an area to support the fore part of a shoe, said anvil being mounted on the supporting member and having rows of openings in the working face about a portion of the margin thereof adapted to receive one or more enlargements to adjustably position the same, a complemental member cooperating with said anvil, and guide means extending above the anvil and normal thereto and pressure means movable in said guide means to press the complemental member in contact with the sole and cause localized pressure over the enlargements.

In testimony whereof, I hereunto set my hand.

ABRAHAM SACHS.